United States Patent [19]
Penisson

[11] Patent Number: 5,461,905
[45] Date of Patent: Oct. 31, 1995

[54] METHOD AND APPARATUS FOR TESTING OILFIELD TUBULAR THREADED CONNECTIONS

[75] Inventor: Dennis J. Penisson, Raceland, La.

[73] Assignee: Bilco Tools, Inc., Houma, La.

[21] Appl. No.: 229,573

[22] Filed: Apr. 19, 1994

[51] Int. Cl.[6] .................................................. G01M 3/28
[52] U.S. Cl. ........................... 73/46; 73/49.1; 73/49.5
[58] Field of Search .......................... 73/46, 49.1, 49.5, 73/49.6, 40.5 R

[56] References Cited

U.S. PATENT DOCUMENTS

| | | | |
|---|---|---|---|
| 3,795,138 | 3/1974 | Hasha | 73/49.1 |
| 3,800,596 | 4/1974 | Phillips et al. | 73/40.5 R |
| 3,872,713 | 3/1975 | Ilfrey et al. | 73/40.5 R |
| 3,921,437 | 11/1975 | Hauk | 73/40.5 R |
| 3,934,464 | 1/1976 | McCauley | 73/832 |
| 4,077,250 | 3/1978 | Wesch | 73/49.8 |
| 4,081,990 | 4/1978 | Chatagnier | 73/40.5 R |
| 4,185,492 | 1/1980 | Hauk et al. | 73/46 |
| 4,413,501 | 11/1983 | Schrock | 73/49.6 |
| 4,416,147 | 11/1983 | Hasha | 73/49.6 |
| 4,548,069 | 10/1985 | Nousak | 73/49.5 |
| 4,926,680 | 5/1990 | Hasha | 73/46 |
| 4,998,435 | 5/1991 | Miller et al. | 73/40.7 |
| 5,209,105 | 5/1993 | Hasha et al. | 73/49.1 |

Primary Examiner—Hezron E. Williams
Assistant Examiner—Michael J. Brock
Attorney, Agent, or Firm—Browning, Bushman, Anderson & Brookhart

[57] ABSTRACT

Equipment and techniques test the integrity of one or more seals within an oilfield tubular threaded connection 12. A test fixture 74 may be utilized including three axially spaced sensors 92, 86 and 88 which are each responsive to radial deformation of an outer surface of an internally pressurized threaded connection. Excessive radial deformation indicates a failure of at least one of the threaded connection seals. A relatively simple yet highly reliable technique is provided for quickly and easily determining the sealing integrity of a threaded connection made up at a well site. If any one of the multiple seals fails during the test, the operator may either break out and re-test the connection, or may make up and test a new threaded connection. The present invention may be used for substantially increasing the integrity of oilfield tubular connections and thereby reducing the overall cost of hydrocarbon exploration and recovery operations.

19 Claims, 3 Drawing Sheets

METHOD AND APPARATUS FOR TESTING OILFIELD TUBULAR THREADED CONNECTIONS

FIELD OF THE INVENTION

The present invention relates to equipment and techniques for testing the integrity of oilfield tubular threaded connections. More particularly, this invention relates to techniques for pressurizing the interior of a tubular connection in order to detect the failure of one or more of the connection seals.

BACKGROUND OF THE INVENTION

Various techniques and equipment have been utilized for testing the integrity of fluid barriers and seals. U.S. Pat. Nos. 3,795,138 and 3,934,464 disclose techniques and equipment for testing the bursting strength of plastic pipe. U.S. Pat. No. 4,077,250 discloses techniques for determining the bursting pressure of metal pipe. U.S. Pat. Nos. 4,416,147 and 4,413,501 disclose hydrostatic testing or pressure testing techniques for determining the integrity of a pipe joint and a flexible tubing, respectfully. U.S. Pat. No. 3,872,713 discloses techniques for detecting a tubing hanger leak, and more specifically for testing a subsea wellhead seal assembly which includes monitoring the diameter of the inner bore of the pipe string below the seal assembly.

Those skilled in the art of oilfield tubulars and the threaded connections for those tubulars recognize that, regardless of the theoretical integrity of the oilfield tubular and/or the theoretical integrity of the threaded connection of coupled tubulars forming the tubing string, the actual integrity of the tubular connection practically must be determined at the oilfield drilling rig or pipe rack site where the connection is made-up. The equipment and techniques for performing this function accordingly must be rugged yet highly reliable.

Many oilfield tubular connections currently are not field tested after make-up at the well site due to the time and expense associated with the testing procedure. Nevertheless, the costs and delays associated with correcting a leaking connection once positioned downhole favor increased use of techniques and equipment to sequentially test each threaded connection at the well site immediately subsequent to the make-up operation. Moreover, the benefits of testing each threaded connection increase with increased use of oilfield tubulars in deep wells, with the increased use of connections adapted for withstanding higher pressure differentials and/or corrosive downhole fluids, and with the increased use of threaded connections utilizing multiple and increasingly sophisticated seals.

Various techniques have thus been devised specifically for testing the integrity of each oilfield tubular connection made up at the well site. The interior of a tubular may be pressurized, using packers to isolate the tubular stand to be tested, as disclosed in U.S. Pat. No. 3,800,596. Once the interior of the tubular connection has been pressurized, this interior pressure may be monitored by a conventional gauge, and the decrease in pressure over time may thus indicate a leak of the threaded connection, as disclosed in U.S. Pat. No. 3,795,138. Alternative techniques for detecting a leak of a pressurized oilfield connection utilize a gas detector or sniffer, as disclosed in U.S. Pat. Nos. 4,926,680 and 4,998,435. U.S. Pat. No. 4,081,990 discloses additional technology for conducting a hydrostatic pressure test on an oilfield tubular. U.S. Pat. No. 4,548,069 discloses a relatively complex testing tool for pressure testing the interior of a oilfield tubular connection.

Others skilled in the art of testing the integrity of oilfield tubular threaded connections have encouraged the use of equipment and techniques which pressurize the exterior of the oilfield tubular connection. U.S. Pat. Nos. 3,921,437 and 4,185,492 disclose complicated devices for forming a sealed chamber exterior of the connection, so that this chamber can be pressurized and a pressure drop in this chamber detected to indicate a leak in the oilfield tubular connection. U.S. Pat. No. 5,209,105 discloses techniques for both externally and internally testing a tubular connection, and particularly discloses a technique for conducting a low pressure test to indicate leakage of a connection seal which might not leak at a higher test pressure.

Because of the difficulties and cost associated with reliably forming a pressurized fluid chamber exterior of the threaded connection, most oilfield tubular connections are tested utilizing high pressure internal of the connection, with the leak detection equipment being associated with either a drop in interior fluid pressure, or with the visual or chemical detection of fluids escaping externally from the made-up connection.

In spite of the advancements made in pressure testing the integrity of oilfield connections at the well site, significant problems has severely limited the acceptance of this procedure in the oil and gas exploration and recovery industry. Many oilfield tubular threaded connections rely upon multiple seals within each connection, with each seal being capable of independently sealing the connection, at least for the relatively short time period of a test. Accordingly, a metal-to-metal shoulder seal and a tapered flank seal within the connection may leak, but the O-ring or other elastomeric seal downstream from the shoulder and flank seals may reliably contain the test pressure. This back-up arrangement of multiple seals may be desirable to obtain an extended life for the connection, but adversely affects the connection integrity test. If the O-ring seal holds during the test, the connection will be placed downhole, where the high temperature and corrosive downhole fluids can pass by the failed shoulder and flank seals to deteriorate the O-ring seal, thereafter causing a connection sealing failure.

Another significant problem with prior art techniques for testing oilfield tubular connection integrity relates to the substantial time required to reliably conduct an effective test. For example, even if both the metal-to-metal flank seal and the downstream O-ring seal of a connection leak during a test, the threads downstream from the O-ring seal may form a temporary seal which prevents the detection of a fluid leak for a time period of approximately 30 minutes or more. Accordingly, a slow leak past both the flank seal and the O-ring seal will spiral slowly through the interstices between the mating threads, with the pipe dope or other thread lubricant preventing the rapid escape of fluids outwardly from the connection during the test period. Those skilled in the art will appreciate that the cost associated with making up and testing each oilfield connection at the well site seldom allows this much time to be expended trying to detect a leaking connection. Accordingly, tubular connections with one or more failed seals are frequently passed through inspection, and are subsequently discovered when the repair and downtime expenses associated with correcting the failed connection are extremely high.

Other problems associated with the equipment used to test the integrity of oilfield tubular threaded connections relates to the high cost and expense associated with the testing procedure itself. Equipment capable of reliably testing threaded connections in a laboratory environment often cannot be reliably used at a well site, where the environment changes drastically, where the made-up connection may be externally dirty, and where the test operator may not be properly trained in the use of the test equipment. If the tubular connection is internally pressurized, the exterior of the connection frequently must be manually cleaned so that the gas detection or other test equipment will be able to detect the escape of fluids from the connection. Other problems associated with prior art test procedures relate to the subjectivity typically required by the test operator to determine if the connection is reliably made up.

The disadvantages of the prior are overcome by the present invention, and improved methods and apparatus are hereinafter disclosed for easily and reliably testing the integrity of an oilfield tubular threaded connection at a well site, thereby substantially increasing the reliability of the downhole connection and thereby reducing the overall cost of the hydrocarbon exploration and recovery operation.

SUMMARY OF THE INVENTION

According to the present invention, an oilfield tubular connection is internally pressurized at or near the well site. Preferably each connection is pressure tested immediately after make-up of the connection, so that a failed connection may be promptly broken-out, inspected, repaired or replaced as necessary, and the connection again made up and re-tested.

The technique according to the present invention relies upon the relatively minor additional deformation of the connection material in the event of a leakage past one or more of the connection seals. A failed flank seal accordingly will pass pressurized fluid to a void axially positioned between the flank seal and the O-ring seal, and the connection material radially exterior of this void will flex or deform slightly radially outward in response to this increased pressure. This radially deflection or deformation may be sensed by a strain gauge test fixture or other test equipment disclosed hereafter, with the output from the test sensor being input to a computer which processes and displays the test data, and which optionally determines and signals the operator whether the connection passes or fails the test. As an alternative to the strain gauge test fixture, a laser sensor may be used to measure material deformation of the connection material. This embodiment has a substantial advantage of not requiring that the sensor or test fixture physically contact the connection during the test. Still another embodiment utilizes a fiber optic line to sense deformation of the connection in response to pressurized fluid passing by one or more of the connection seals. This embodiment has a safety advantage of keeping electrical equipment separate from the hazardous drilling floor area where the connection is made up.

A significant advantage of the present invention is that a relatively short time period, e.g., 30 seconds, is required to reliably conduct an integrity test on a tubular connection. The connection material deformation may be measured at one or more locations on each connection, so that the failure of a flank seal can be detected, even if the downstream seal axially spaced from the flank seal is maintained, by utilizing a sensor responsive to material deformation in the area between the flank seal and the downstream seal. Alternatively, the failure of both a flank seal and the downstream seal can be detected by providing another material deformation sensor responsive to material deflection downstream from the O-ring seal. Accordingly, this test operator will be able to reliably determine that one or more of the multiple seals in the connection has failed the test, and need not wait for the pressurized fluid to pass through the spiralling threads to reliably determine that the connection has failed the test.

It is an object of the present invention to provide improved techniques and equipment for reliably testing the sealing integrity of a oilfield tubular threaded connection. The techniques of the present invention rely upon an interior connection pressure, and the test may be easily and reliably performed at the well site.

It is another object of this invention to test the sealing integrity of an oilfield tubular threaded connection having multiple seals by determining connection material deformation which is responsive to leakage past one or more of the multiple seals. This technique allows a test operator to reliably determine that an upstream seal of the threaded connection has failed, even though a downstream seal within the threaded connection reliably seals the pressurized fluid within the connection.

It is a significant feature of this invention that the oilfield tubular connection test may be conducted quickly and thus inexpensively. Leakage of fluids through the entire threaded connection is not required to determine whether the connection fails or passes the integrity test.

Yet another feature of this invention relates to the high reliability and accuracy of the oilfield tubular connection test procedure. The technique of this invention may substantially assist the test operator in reliably determining that one or more of the multiple seals within the oilfield tubular threaded connection has failed the test.

Another significant feature of the present invention is that laser technology may be reliably utilized for measuring deformation of the connection material. This embodiment does not require a test fixture or sensor to make physical contact with the connection in order to perform the integrity test.

It is a particular feature of the present invention that the sensor utilized to measure deformation of the connection material in response to interior connection pressure may be responsive to radial deformation of an exterior surface of the connection, or to circumferential expansion of the connection. A circumferential or hoop strain gauge may thus be utilized to measure connection deformation, or a fiber optic line having a length secured to the connection may be used to detect the expansion of the connection circumference. According to a preferred embodiment, the test sensor is directly responsive to radial deformation of an exterior surface of the threaded connection.

An advantage of this invention is that the output from the connection material deformation sensor may be input to a computer, where the data may be processed and displayed. If desired, the computer may output a signature which may be compared by either the computer or a test operator to a baseline signature in order to determine whether a particular threaded connection fails or passes the integrity test. Alternatively, a maximum numerical value for material deformation may be selected, and the computer used to determine whether that value has been exceeded in order to signal the operator of the test result.

These and further objects, features, and advantages of the present invention will become apparent from the following detailed description, wherein reference is made to the figures of the accompanying drawings.

DETAILED DESCRIPTION OF PREFERRED EMBODIMENTS

Figure 1:
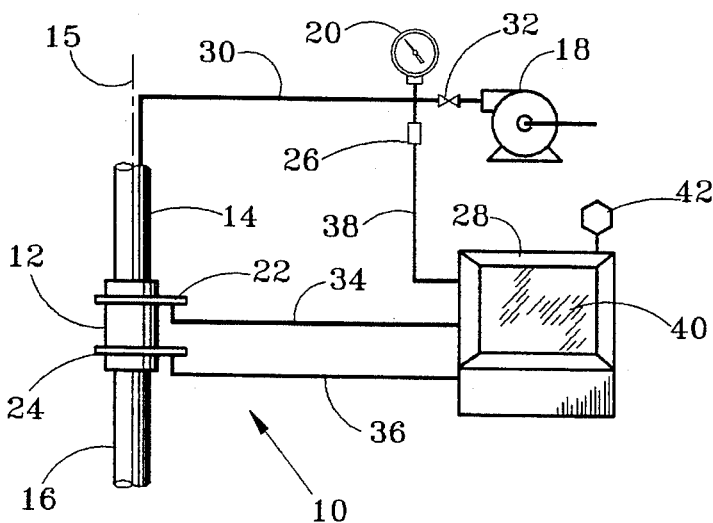
FIG. 1 is a simplified pictorial view of suitable equipment according to the present invention for testing the integrity of an oilfield tubular threaded connection.

FIG. 1 simplistically depicts a suitable system 10 according to the present invention for testing the integrity of a threaded connection 12 which structurally interconnects an upper oilfield tubular 14 and a lower oilfield tubular 16. The oilfield tubulars may be drill pipe, casing, or tubing, and typically have an axial length of approximately 10 meters. The system according to the present invention may include a conventional pressurizing pump 18, a pressure gauge or other pressure monitoring device 20, a pair of hoop strain gauges 22 and 24, a pressure transducer 26, and a computer 28. The pump 18 passes pressurized fluid, e.g., water, into the interior of the oilfield tubular 14 via line 30, thereby pressurizing the interior of the connection 12. The oilfield tubular above and below the connection 12 to be tested may be sealed by conventional devices, such as packers (not shown) commonly used in field hydrostatic testing operations. The desired pressure level is maintained by observing the pressure read-out from gauge 20, and by selectively controlling valve 32 to maintain the pressure within the connection 12 at the desired level. The output from the pair of sensors 22 and 24 is passed to the computer through lines 34 and 36, respectively, while a reading of the pressure level supplied to the interior of the connection 12 may be transformed by transducer 26 into a corresponding electrical signal which is similarly passed to the computer 28 by line 38. The output from the computer 28 may include a display 40, and the computer 28 may control the activation of a visual or audible alarm 42, as discussed subsequently.

Figure 2:
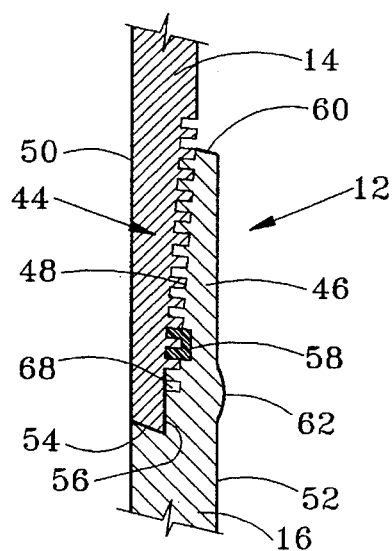
FIG. 2 is a cross-sectional view of a typical pin and box oilfield tubular threaded connection which may be tested according to the techniques of present invention.

FIG. 2 depicts one type of pin and box oilfield tubular threaded connection 12 which may be tested according to the present invention. Those skilled in the art will appreciate that the connection is a generally sleeve-shaped member having an axis coaxial with axis 15 of the tubulars 14 and 16, as shown in FIG. 1. The connection 12 as shown in FIG. 2 includes a pin member 44 formed at the lower end of oilfield tubular 14, and a box member 46 formed at the upper end of the tubular 16, with the pin and box members being mechanically coupled by threads 48. The flow path through the tubular is defined by the generally cylindrical interior surface 50 of the tubulars 14 and 16, with the tubular surface 52 being an exterior tubular surface.

Figure 3:
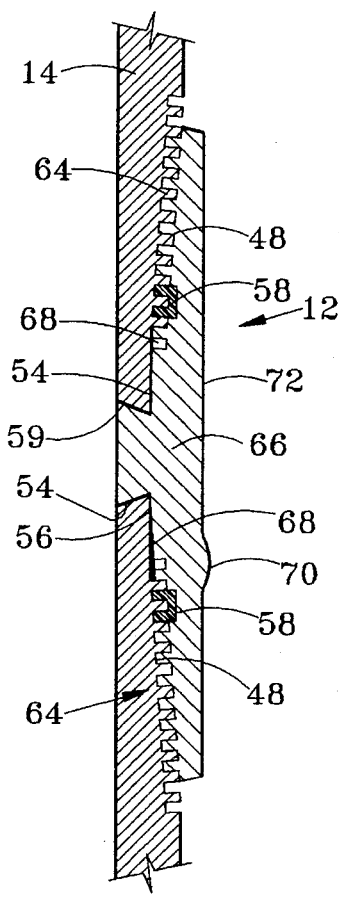
FIG. 3 is a cross-sectional view of a typical oilfield tubular coupling connection which may be tested according to the techniques of the present invention.

The connection 12 as shown in FIG. 2 includes four independent seals each theoretically capable of at least temporarily sealing pressure within the interior of the connection: (1) a metal-to-metal shoulder or end seal 54, which may include faces either perpendicular to axis 15 or slightly inclined with respect to a plane perpendicular to axis 15, (2) a metal-to-metal flank seal 56 spaced downstream (in a fluid sense) from the shoulder seal, with the flank seal typically being slightly inclined or tapered with respect to axis 15 to form a reliable metal-to-metal seal made-up during the assembly of the tubulars, (3) an elastomeric seal 58, which may have either a circular or rectangular cross-sectional configuration and may be formed from any suitable rubber, elastomeric, or metal/rubber/elastomeric material, and (4) the seal formed by the mating threads 48. The connection 12 as shown in FIGS. 2 and 3 includes an elastomeric seal initially having a generally rectangular cross-section configuration, although the seal may be deformed to a substantially U-shaped or M-shaped configuration by the mating threads. As previously noted, threads 48 may not form a reliable independent seal over a substantial period of time, but typically are quite effective to prohibit leakage from the connection during a relatively short test period. Those skilled in the art will appreciate that the connection as shown in FIG. 2 may be conventionally tested utilizing a gas detector having an inlet adjacent the last thread 60 on the box 46. According to the present invention as explained in detail below, pressurized fluid leakage past seals 54 and 56 will cause a radially outward material deflection 62 of the connection, which is exaggerated in FIG. 2 to illustrate the concept used to test seal failure.

FIG. 3 discloses a typical oilfield tubular coupling connection 12 which may be tested in accordance with the present invention. Lower and the upper ends of each of the tubulars 14 and 16 include a threaded pin end 64, and adjacent pin ends are structurally interconnected by a connection coupling 66. The pin ends and the coupling 66 may be interconnected by the threads 48 as previously discussed, and the connection 12 includes independent seals 54, 56, 58 and 48 between the coupling 66 and each of the tubulars 14 and 16, as previously described. It is a particular feature of the invention that the metal-to-metal seal 56 is spaced axially from the O-ring seal 58, so that a pressure increase in the void area 68 between a failed seal 56 and a held seal 58 may cause connection deformation at the exterior of the surface of the coupling 66 radially outward from the void 68, as shown in FIG. 3. While the connection deformation 70 is again exaggerated in FIG. 3 for purposes of explanation, it may be seen that the tubular 14 and the coupling 66 form a reliable seal since no significant deformation occurs at the exterior surface area 72 of the coupling 66, while the tubular 16 and coupling 66 seals failed the pressure integrity test, as evidenced by the deformed exterior surface 70 at the position radially outward of and axially at the elevation of the void 68 between the failed seal 56 and the maintained or held seal 58.

Referring again to FIG. 1, the technique of the present invention may be initiated by clamping a pair of hoop-strained gauges 22 and 24 about the circumference of a coupling 12. The gauges 22 and 24 are each electrically connected with computer 28, which in turn outputs both a visual display 40 and an activation signal to an audible or visual alarm 42. For this example, the connection 12 is of the coupling-type, as shown in FIG. 3, and the gauges 22 and 24 thus monitor circumferential hoop strain in the vicinity of the outer surface areas 72 and 70, respectively. The radially outward deformation of the coupling material slightly expands the outer diameter of the coupling, which in turn slightly increases the circumference of each clamp. A strain gauge on each clamp that measures hoop strain which is indicative of the outer surface deformation of the connection at the locations 72 and 70. As previously explained, this radially deformation, although slight and visually imperceptible, can be accurately monitored by sensor equipment to provide a reliable indication of the failure of one or more of the seals in the oilfield tubular threaded connection. Each of the hoop strain gauges 22 and 24 may be of the type disclosed in U.S. Pat. No. 4,957,002.

After the strain gauges have been clamped on the connection, valve 32 may be opened so that the pressure from the pump pressurizes the interior of the interconnected tubulars 14 and 16 and thus the interior of the connection 12. An electrical signal indicative of the pressure within the connection is transmitted via line 38 to the computer. While various techniques may be used for processing the data from the sensors and from the pressure transmitter 26, one embodiment of this invention simply displays the output from the strain gauges 22 and 24 as a function of time during the period when the connection 12 is pressurized by the pump 18.

Figure 8:
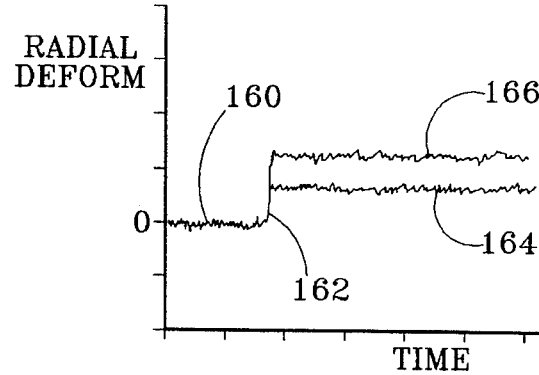
FIG. 8 graphically depicts connection material deflection as a function of time, and illustrates both a failed connection and a satisfactory connection according to the present invention.

Referring very briefly to FIG. 8, the output from the computer 28 may thus plot radial deformation (which is related to hoop strain) as a function of time. Pumping pressure is initiated at time 0, and plot line 160 may represent the time it takes for the pressure to increase within the tubular sufficiently to cause any significant material deformation of the connection. Plot line 162 represents the increase in pressure, and line 164 indicates that there has been a measurable radial expansion of the connection, which is to be expected with the pressure increase within the connection 12. Since the radial expansion is substantially constant and has not increased above an acceptable level, line 164 indicates to the operator a "passed" connection for the data from strain gauge 22 corresponding to an acceptable amount of radial deformation in the area 72.

Line 166 as shown in FIG. 8, however, it is indicative of measurements from the strain gauge 24, which is responding to radial deformation of the connection in the area 70 as shown in FIG. 3. The failure of the seals 54 and 56 thus increases the pressure in the void 68, causing the radial expansion of the connection in the area 70, which in turn is transmitted by the gauge 24 to the computer to generate plot line 166. Since measurements from both strain gauges would correspond approximately to the line 164 if the connection had long term sealing integrity, the presence of line 166 indicating a radial deformation over an acceptable level indicates a failure of the connection, so that the alarm 42 may be activated. In this case, the drilling operator may thus break-out the connection, and either re-make the connection after inspection, cleaning and/or repair of one or more of metal sealing surfaces and/or replacement of the elastomeric seal, or may re-make the connection with a new coupling. In either event, the connection is then tested and, if passed, the next coupling is made up and tested.

Figure 4:
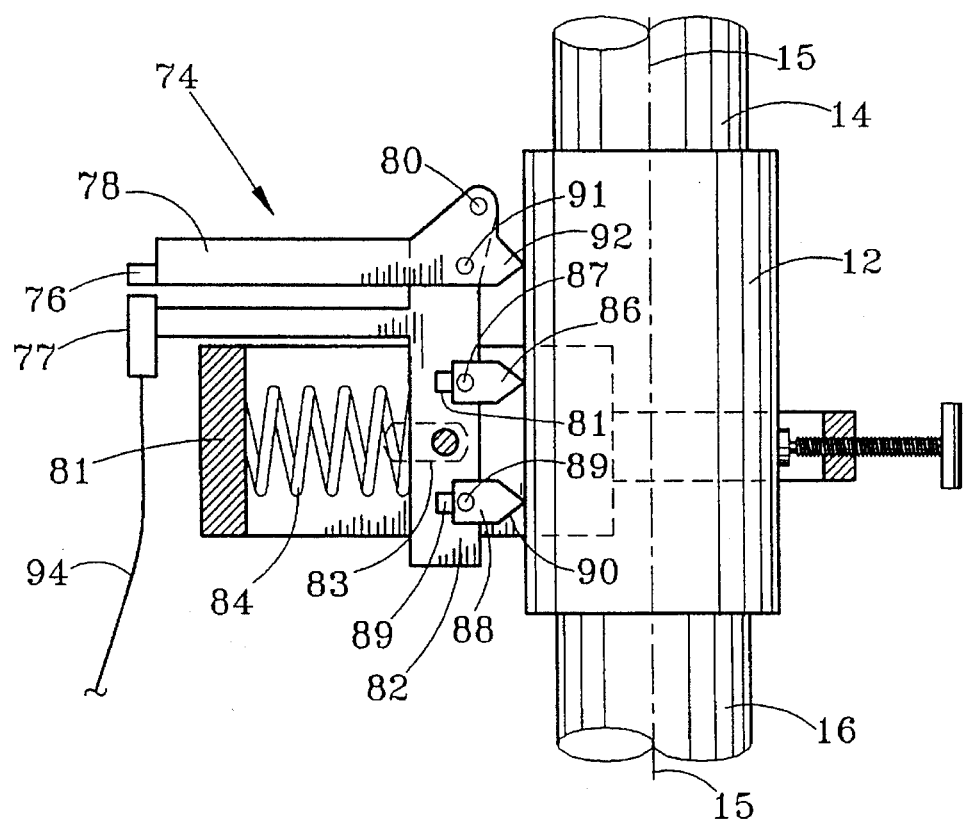
FIG. 4 is an elevation view of a strain gauge test fixture according to the present invention positioned for testing the integrity of an oilfield tubular threaded connection.
Figure 5:
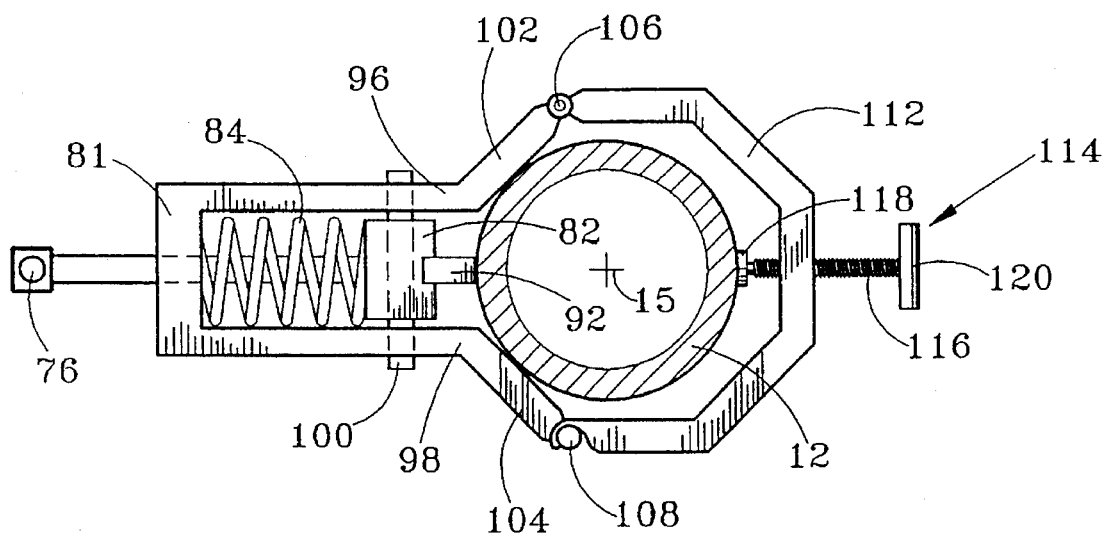
FIG. 5 is a top view of the strain gauge test fixture shown in FIG. 4.

FIGS. 4 and 5 depict a preferred embodiment of a test fixture 74 according to the present invention for detecting material deformation of an exterior surface of an oilfield tubular connection. Again, it may be assumed that connection 12 is of the coupling type, and that surface measurements at at least two different elevations along the connection (e.g., areas 72 and 70) are desired. Test fixture 74 includes frame 81, and an arm 78 pivotally mounted to frame 81 about pivot pin 80. The view in FIG. 4 is taken laterally outward of the spring 84 and inward of the vertical plate 48 discussed subsequently, so that the rear end of the frame and the door 112 are shown in cross-section. Contact support member 82 is radially moveable with respect to the frame 81, and includes a lower deformation contact 88 and an intermediate deformation contact 86. Pin 100 as shown in FIG. 5 is thus free to move within slot 83 as shown in FIG. 4. The contact support member 82 is biased radially inward by a spring 84 or other biasing member.

Referring to FIG. 5, the frame 81 includes two parallel vertical plates 96 and 98 each spaced for receiving the sensor support member 82. Each plate includes an integral and outwardly extending plate portion 102 and 104, respectively. A fixture door 112 has a substantially C-shaped cross-sectional configuration as shown in FIG. 5, with the door being pivotally mounted to plate portion 102 about hinge 106. The free end of the door 112 may be interconnected with the plate portion 104 by latch 108. The fixture 74 may thus be moved generally into engagement with the connection, then the door 112 closed and latched. A positioning member 114 may then be activated to push the connection 12 into engagement with both of the plate portions 102 and 104, thereby fixing the position of the test fixture 74 with respect to axis 15. To activate the positioning member 114, the operator merely rotates handle 120, which radially moves threaded member 116 and engagement pad 118 with respect to axis 15. Pad 118 thus keeps the fixture 74 properly positioned during the test, i.e., fixed between pad 118 and plate portions 102 and 104.

Once the door 112 is latched, each of the upper deformation sensor 92 fixed to the radially inward and of the arm 78, and both the intermediate deformation contact 86 and the lower deformation contact 88 supported on member 82 will be in engagement with the outer surface of the connection 12. The test fixture 74 includes three axially spaced contacts each capable of transmitting radial deformation movement at a selected elevation along the tubular to a sensor, with the intermediate contact 86 serving as a reference contact. One of the upper and lower contacts, e.g., contact 92, is pivotally mounted with respect to the other contacts, as shown in FIG. 4, so that each of the three axially spaced contacts will engage the connection. Each contact 92, 86, and 88 preferably has a connection contact point 90, which may be slightly rounded to prevent the contact from digging into the connection material in response to the biasing spring 84. A target 76 is generally depicted for moving with respect to sensor 77 in response to pivoting movement of arm 78 with respect to frame 81. A similar target and sensor may be used to detect movement of contacts 90 and 86 with respect to the frame. The sensor itself may be an air-gap, LVDT, laser type, or other conventional displacement sensor having the desired degree of accuracy. The test fixture accordingly may support three connection contacts (1 reference contact and 2 monitoring contacts) each radially movable in response to radial deformation of an outer surface of the connection, with each contact movement being detected by a laser displacement sensor. The signal from each of three displacement sensors on the test fixture, each responsive to radial movement of an outer surface of the connection, may be transmitted to the computer via electrical line 94. Once the contacts are generally positioned as shown in FIGS. 4 and 5, a hammer may be used to tap the connection and thereby "set" the contacts on the connection in preparation for the test.

The sensors used with the fixture as shown on FIGS. 4 and 5 each desirable measure radial deformation of an exterior surface of the connection. Tests have indicated that this radial deformation is substantially uniform at a particular elevation of the connection (circumferential deformation is substantially uniform), so that tests at different circumferential positions about the connection are not required. The contact 86 acts as a background or reference contact, while the contacts 92 and 88 are each monitoring deformation at a selected connection area, e.g., areas 72 and 70 as shown in FIG. 3. The three-point contact design of the test fixture as shown in FIGS. 4 and 5 avoids calibration procedures which typically are required when only upper and lower hoop strain gauge clamps are utilized. Accordingly, the fixture as discussed herein has significant advantages in increased reliability and reduced test time compared to the embodiment as shown in FIG. 1. Three-point test fixture design essentially results in each of the three contacts moving at substantially the same rate when the connection passes the test. The output from one or both of the contacts 88 and 92 will be at a rate substantially different than the intermediate contact 86 if there is a leakage between the coupling 66 and either the lower or upper tubular, respectively. The fixture design as shown in FIGS. 4 and 5 does not require calibration of the sensors 87 and 89 associated with the contacts 86 and 88 to determine whether there has been an acceptable radial deformation at the location 72 and 70 indicative of a reliable connection, or the unacceptable deformation at one or both the locations 72 and 70 indicating a seal failure and thus a test rejection from the computer. It should be understood that connection 12 may be tested at an exemplary pressure of between 10,000 psi and 20,000 psi, and the test period during which the connection is internally pressurized may be less than 30 seconds. The entire testing operation of a particular connection may thus be performed in several minutes or less.

Figure 9:
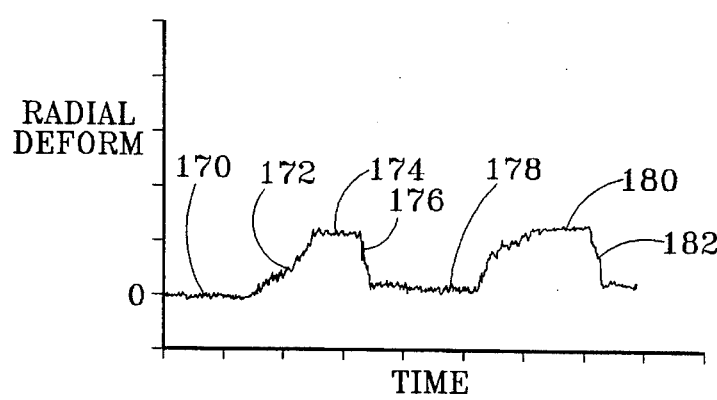
FIG. 9 illustrates connection material deflection as a function of time for a failed connection according to the present invention.
Figure 10:
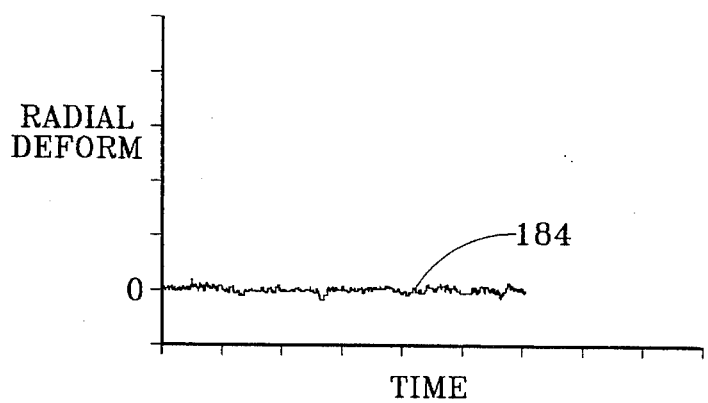
FIG. 10 illustrates connection material deflection as a function of time for a satisfactory connection according to the present invention.

FIG. 9 indicates a representative plot that may be displayed on screen 40 for viewing by a test operator, or may be output in hard copy (paper) for maintaining a record of the oilfield tubular makeup operations. As with FIG. 8, radial deformation is plotted as a function of time. In FIGS. 9 and 10, the output is radial deformation from each of the sensors associated with contacts 92 or 88 compared to radial deformation from the baseline sensors associated with contact 86. If the radial deformation of the connection from the sensor corresponding to contact 92 corresponds substantially with the radial deformation of the baseline sensor corresponding to contact 86 during the pressurizing test, the output from the sensor 92 less the output from the radial deformation sensor 86 will be substantially zero, resulting in the test plot 184 as shown in FIG. 10.

If there is a significant discrepancy between the output from one of the sensors 91 or 89 associated with contacts 92 or 88 compared to the base line sensor 87 associated with contact 86, the graphic output as a function time may be depicted as shown in FIG. 9. For the connection as shown in FIG. 3, the failure of the seals 54 and 56 increases the radial deformation at the location 70 compared to a location intermediate locations 72 and 70. During a low pressure period of the test, no significant difference between the outputs from the sensors associated with contacts 86 and 88 results in the line 170 as shown in FIG. 9. The further increase in test pressure creates the radially outward movement of the connection in the area of contact 88 compared to the real-time deformation in the area of contact 86 to result in the plot line 172 as shown in FIG. 9. A substantially maximum radial deformation difference is finally achieved, as evidenced by plot line 174. The subsequent decrease in pressure thus results in plot lines 176 and 178, indicating the elastic deformation of the connection material. The subsequent increase in pressure is graphically depicted by the plot line 180 as shown in FIG. 9, thereby confirming the failure of the seals 54 and 56 between the coupling 66 and the lower tubular 16. The interior connection pressure may then be reduced, resulting in test line 182, at which time the test is terminated.

It should be understood that the computer may compare the signature of the test plot with a baseline test signature to determine whether the connection has passed or failed the test, although an operator may also make this determination by comparing the acceptable plot of FIG. 10 and the unacceptable plot of FIG. 9. It should also be understood that a signature of the connection exterior surface deformation as a function of time is not required to determine whether the connection fails or passes the test, particularly when the test fixture 74 as shown in FIGS. 4 and 5 is used. For this embodiment, either the computer or the operator may set a maximum deformation level for the output sensors corresponding to contacts 88 and 92 compared with the baseline sensor corresponding to contact 86. As soon as this deformation differential exceeds the selected maximum value, the connection will fail the test.

Figure 6:
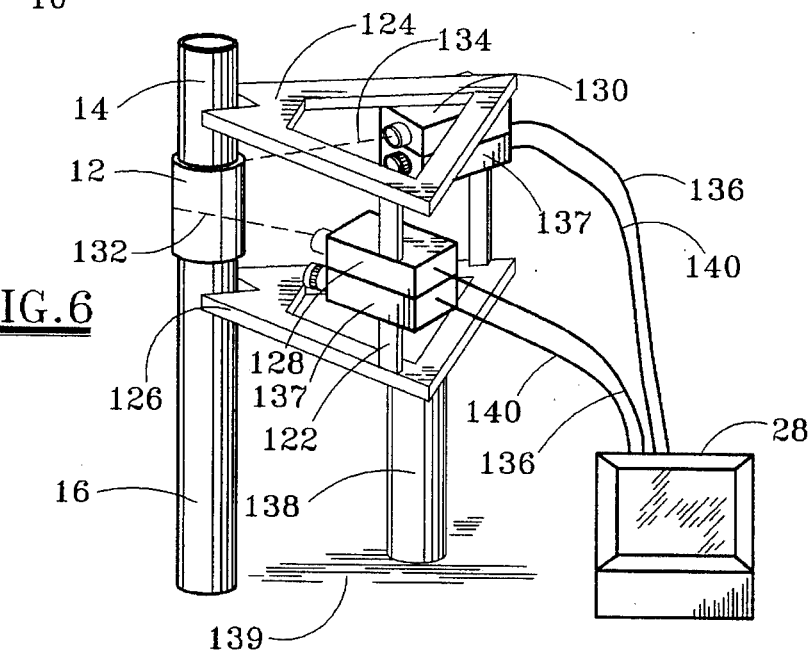
FIG. 6 is a simplified pictorial view of a laser test equipment according to the present invention for testing the integrity of an oilfield tubular threaded connection.

FIG. 6 depicts another embodiment of the present wherein laser technology is employed to measure the radial deformation of an exterior surface of an oilfield tubular connection at selected axial locations (elevations) along the connection. A pair of lasers 128 and 130 are positioned at an elevation from one to two meters above the rig floor 139. Each of the laser beams is directed radially to a particular axial location on the connection, as previously described, with the laser beams 132 and 134 being circumferentially spaced at an angle of from 30° to 60° with respect to each other. A camera 137 is positioned to receive returning signals and display the results on the screen 40, if desired. Each of the lasers is interconnected with computer 28 via line 136, while line 140 interconnects a corresponding camera with the computer 28. Alternatively, a Keyence LC Series laser may be used. Each of the beams 132, 134 from the respective laser 128, 130 preferably are directed at the side edge (tangent to the outer surface of the connection), and may monitor radial deformation of the exterior surface of the connection at one or more axially spaced locations. Accordingly, a single laser may be used rather than the pair of lasers depicted in FIG. 6. Also, a camera and mirror assembly may be employed with each laser to receive signals returned from the connection and thereby monitor radial deformation of the outer surface of the connection.

In order to fix the position of the lasers and the camera with respect to the connection, a locating bracket 122 may be used. Bracket 122 has upper and lower notched plates 124 and 126 which may engage the tubulars 14 and 16, respectively, so that the radial position of the lasers and the camera with respect to the connection 12 will remain constant during each of these successive tests. Alternatively, this radial positioning may be obtained by supporting the lasers and camera on a test stand 138, which in turn may be adjustably secured to the rig floor 139. Since the lower tubular 16 and thus the connection 12 are substantially fixed with respect to the rig floor, stand 138 also substantially fixes the position of the test equipment with respect to the connection 12. The equipment as shown in FIG. 6 is desirable since lasers are capable of a very rapid response to indicate radial deformation at a selected location along the outer surface of a connection, and since the material deformation measurements from a laser offer high resolution and are capable of detecting radial deformation of one micron or less. This laser technique also has substantial advantage of low set up cost, and the further advantage that the test equipment need contact connection 12 during the test. As previously noted, the locating bracket 122 may be deleted, and the lasers and camera positioned by test stand 138, so that no components of the test equipment need contact either the connection or the tubulars interconnected by the connection.

Figure 7:
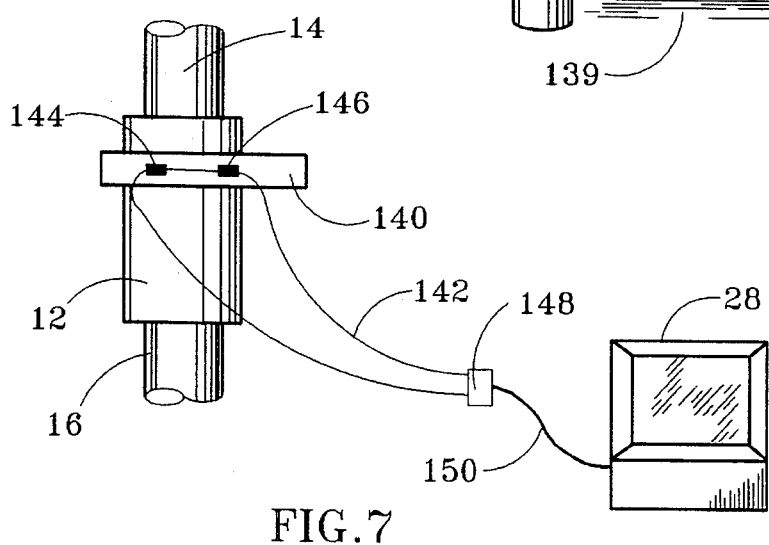
FIG. 7 is a simplified pictorial view of fiber optic test equipment for testing the integrity of an oilfield tubular threaded connection.

FIG. 7 depicts another embodiment of the invention, wherein a clamp-on ring member 144 is interconnected with a fiber optic loop 142 to detect hoop expansion, thereby indicating a passed or failed connection. A fiber optic transmitter/receiver 148 is provided, with line 150 interconnecting the transmitter/receiver 148 with the computer 28. Points 144 and 146 on the fiber optic line 142 may be fixed with respect to the clamp member by gluing or other suitable connectors. The circumferential expansion of the clamp 140 is thus indicative of the circumferential expansion of the connection at a suitable axial location. The stretching of the fiber optic line between points 144 and 146 is thus indicative of radial deformation of an outer surface of the threaded connection. Signals transmitted through the fiber optic line are altered by the slight expansion of the line between points 144 and 146 in response to increased pressure within the connection. Computer 28 is able to determine whether the deformation of an outer surface of the tubular at the axial location of clamp 140 is within or exceeds an acceptable limit. Although not depicted in FIG. 7, those skilled in the art will appreciate that another fiber optic loop may be provided for detecting radial movement of the exterior surface of the connection at a lower point along the threaded connection 12. Also, an intermediate clamp and fiber optic loop may be utilized for providing a base line or reference signal functionally similar to the signal provided by the sensor 86 previously described.

The apparatus and techniques of the present invention thus provide a relatively simple and inexpensive procedure for reliably determining whether one or more of the multiple redundant seals within the threaded connection of an oilfield tubular have failed, thereby providing a reliable method of quickly testing the integrity of each threaded connection as it is made up at the well site. Any number of suitable computers may be used for processing the data from the sensors, and for displaying the output to an operator, and for determining whether the maximum allowable radial deformation of tubular outer surface has occurred. As previously noted, the techniques of the present invention may be used on both a pin and box connection and a coupling-type connection. Various gauges may be utilized for detecting circumferential or hoop expansion of connection at a particular location, which in turn is indicative of radial deformation, including strain gauges, air gap sensors, LVDT-type sensors, electric gauges, or fiber optic sensors. According to a preferred embodiment of the invention, however, the sensors are directly responsive to radial movement of an outer surface of the connection at a particular location along the connection. A suitable laser according to the present invention may be of the type manufactured by Adrens Tech, Inc. in La Puenta, Calif., and in particular the LBS series laser. Accordingly, the use of contacts (preferably two or more) as explained above allows for the easy use of various types of displacement sensors. The embodiments as shown in FIGS. 4–6 are particularly suitable for accurately detecting the integrity of a threaded connection. The test equipment may be set up at an elevation of from one to two meters above the rig floor, and the test fixture either attached to the connection, as shown in FIG. 5, or the test equipment otherwise radially positioned with respect to connection, as shown in FIG. 6.

Those skilled in the art will appreciate that while various apparatus and techniques have been discussed above for testing the integrity of two types of tubular threaded connections, as shown in FIGS. 2 and 3, the equipment and technique of this invention may be reliably used to test the sealing integrity of various types of threaded connections, and more particularly to test the sealing integrity of "premium" connections having one or more metal-to-metal seals separate from the mating engagement of the threads. For example, a pin and box Hydril connection may include two sets of metal-to-metal shoulder and flank seals axially spaced by the mating threads of the pin and box connection. One sensor may be used to detect if the lower flank seal has failed, and another sensor used to detect whether the upper flank seal has failed. If, for example, the lower flank has failed but the upper flank seal has reliably held in response to the test pressure, prior art test equipment would typically indicate that the connection has passed the test since no escape of fluids from the connection has occurred. According to the present invention, however, the operator may readily determine that the lower flank seal of the Hydril pin and box connection has failed, thereby signaling that the threaded connection should again be made up and retested, or the connection discarded and a new connection made up and tested. A particular feature of this invention is that the reliability of redundant and axially spaced seals along the tubular threaded connection may be tested by detecting radial deformation of an exterior surface of the tubular at an axial position between any two of the axially spaced seals. Various techniques may be used to transmit signals between the computer and each of the sensors, lasers, cameras, etc.

Those skilled in the art will appreciate that the connection to be tested may be pressurized with any suitable liquid or gas, and that various techniques and equipment may be used to internally pressurize a connection for performing the test. Various other modifications to the equipment and to the techniques described herein should be apparent from the above description of the preferred embodiments. Although the invention has thus been described in detail for these embodiments, it should be understood that this explanation is for illustration, and that the invention is not limited to these embodiments. Alternative equipment and operating techniques will thus be apparent to those skilled in the art. In view of this disclosure, modifications are thus contemplated and may be made without departing from the spirit of the invention, which is defined by the claims.

What is claimed is:

1. Apparatus for determining the integrity of one or more seals of an oilfield tubular threaded connection made up at a well site, comprising:

pressurizing means for internally pressurizing the threaded connection while at the well site;

at least one sensor for detecting radially outward deformation of the exterior surface of the threaded connection at a selected axial location along the threaded connection; and a computer for receiving signals from each of the at least one sensor and for determining the integrity of the threaded connection in response thereto.

2. Apparatus as defined in claim 1, further comprising:

the at least one sensor includes at least two axially spaced sensors; and a test fixture for supporting the at least two sensors, the test fixture including a positioning member for radially positioning the test fixture at a fixed location with respect to threaded connection.

3. Apparatus as defined in claim 2, further comprising:

the test fixture including a biasing member for biasing at least one of the at least two sensors into engagement with the exterior surface of the connection.

4. Apparatus as defined in claim 2, further comprising;

a test fixture including a pivot member for pivotally mounting at least one of the at least two sensors with respect to another of the at least two sensors.

5. Apparatus as defined in claim 2, further comprising:

the test fixture including a hinged door for opening and closing about the threaded connection, and latch for temporarily securing the door in its closed position.

6. Apparatus as defined in claim 5, wherein the positioning member is supported on the hinged door.

7. Apparatus as defined in claim 1, further comprising:

the at least one sensor includes at least first and second axially spaced material deformation test sensors and a third material deformation baseline sensor for providing a baseline of acceptable radial deformation of an outer surface of the tubular connection.

8. Apparatus as defined in claim 1, wherein the computer includes comparison means for comparing an output from one or more of the at least one sensor to a preselected deformation value, and for generating a failure signal indicative of a failed integrity test if the sensor signal exceeds the preselected value.

9. Apparatus as defined in claim 1, wherein the at least one sensor includes first and second laser sensors each responsive to radial deformation of an outer surface of the connection.

10. Apparatus as defined in claim 1, wherein the at least one sensor is selected from the group consisting of a strain gauge sensor, air gap sensor, LVDT-type sensor, fiber optic sensor and electrical gauge each responsive to circumferential expansion of a respective test clamp which in turn is functionally related to radial deformation of an outer surface of the threaded connection.

11. A method of determining the integrity of axially spaced seals of an oilfield tubular threaded connection, comprising:

pressurizing the interior of the tubular connection;

measuring radial deformation of an outer surface of the pressurized tubular connection at one or more locations along the axial length of the threaded connection between the spaced seals; and comparing the measured radial deformation with an allowable deformation level to determine the integrity of the threaded connection.

12. The method as defined in claim 11, further comprising:

displaying an output of the measured radial deformation as a function of time.

13. The method as defined in claim 11, further comprising:

activating an alarm if the measured radial deformation exceed a predetermined value.

14. The method as defined in claim 11, wherein the step of measuring radial deformation includes:

generating laser pulses; and striking the exterior surface of the connection with the generated laser pulses.

15. The method as defined in claim 11, wherein the step of measuring radial deformation includes:

measuring radial deformation of the connection at at least three axially spaced locations along the threaded connection, such that at least one of the measurements is a baseline measurement, and the other of the measurements are each compared to the baseline measurement.

16. A method of determining the integrity of one or more axially spaced seals of an oilfield tubular threaded connection, comprising:

pressurizing the interior of the tubular connection;

positioning at least two sensor contacts into engagement with at least two corresponding axially spaced locations along an outer surface of the connection;

measuring radial movement of each of the at least two sensor contacts at the at least two axially spaced locations along the outer surface of the threaded connection; and comparing the measured radial movement with an allowable deformation level to determine the integrity of the threaded connection.

17. The method as defined in claim 16, further comprising:

supporting the at least two sensor contacts on a test fixture; and positioning the test fixture at a fixed radial position with respect to the threaded connection.

18. The method as defined in claim 16, further comprising:

biasing at least one of the at least two sensor contacts into engagement with the threaded connection; and pivotally mounting at least one of the at least two sensor contacts with respect to another of the at least two sensor contacts.

19. The method as defined in claim 16, wherein the step of measuring radial movement includes:

measuring radial deformation of the connection at at least three axially spaced locations along the threaded connection, such that at least one of the measurements is a baseline measurement, and the other of the measurements are each compared to the baseline measurement.

* * * * *